US011238629B2

(12) United States Patent
Otsuka

(10) Patent No.: US 11,238,629 B2
(45) Date of Patent: Feb. 1, 2022

(54) NOTIFICATION DEVICE, NOTIFICATION METHOD, AND RECORDING MEDIUM HAVING NOTIFICATION PROGRAM STORED THEREIN

(71) Applicant: CASIO COMPUTER CO., LTD., Tokyo (JP)

(72) Inventor: Toshihiko Otsuka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/360,833

(22) Filed: Mar. 21, 2019

(65) Prior Publication Data
US 2019/0295301 A1 Sep. 26, 2019

(30) Foreign Application Priority Data
Mar. 22, 2018 (JP) .................................. 2018-054464

(51) Int. Cl.
*G06F 3/01* (2006.01)
*G06K 9/00* (2006.01)
(Continued)

(52) U.S. Cl.
CPC .............. *G06T 11/60* (2013.01); *G06F 3/012* (2013.01); *G06K 9/00288* (2013.01);
(Continued)

(58) Field of Classification Search
CPC ............................. G06T 11/60; A45D 44/005
See application file for complete search history.

(56) References Cited

U.S. PATENT DOCUMENTS 10,607,503 B2 * 3/2020 Shen .................. G06K 9/00255
2008/0165195 A1 * 7/2008 Rosenberg .............. G06T 13/40
345/473
(Continued)

FOREIGN PATENT DOCUMENTS

JP 2001-216386 A 8/2001
JP 2011-008397 A 1/2011
(Continued)

OTHER PUBLICATIONS

"Biometrics." NIST, Sep. 7, 2016, www.nist.gov/programs-projects/biometrics (Year: 2016).*
(Continued)

*Primary Examiner* — Ryan McCulley
(74) *Attorney, Agent, or Firm* — Fitch, Even, Tabin & Flannery LLP

(57) ABSTRACT

A notification device that gives notification of predetermined information can be used more conveniently. A notification device includes a state detecting section, a guidance notifying section, a determining section, and a notification control section. The state detecting section sequentially detects a face state of a subject on the basis of images which are sequentially input. The guidance notifying section gives notification of face guidance information. The determining section determines whether or not the face state sequentially detected by the guidance notifying section satisfies a state corresponding to the notified face guidance information. In a case in which the determining section determines that the state corresponding to the notified face guidance information is satisfied, the notification control section controls the guidance notifying section such that another face guidance information different from the notified face guidance information is notified.

10 Claims, 16 Drawing Sheets

(51) Int. Cl.
    *G06T 11/60*     (2006.01)
    *G06T 7/70*     (2017.01)

(52) U.S. Cl.
    CPC ............ G06K 9/00912 (2013.01); G06T 7/70 (2017.01); *G06T 2207/30201* (2013.01)

(56) References Cited

U.S. PATENT DOCUMENTS

| | | | | |
|---|---|---|---|---|
| 2016/0156840 A1* | 6/2016 | Arai | ..................... | H04N 5/2256 |
| | | | | 348/77 |
| 2016/0357578 A1* | 12/2016 | Kim | ..................... | A45D 44/005 |
| 2017/0255478 A1* | 9/2017 | Chou | ..................... | G06F 3/012 |
| 2019/0191850 A1* | 6/2019 | Yoganandan | ......... | G06F 3/0346 |
| 2020/0069034 A1* | 3/2020 | Godlieb | ................ | A45D 42/08 |

FOREIGN PATENT DOCUMENTS

| | | |
|---|---|---|
| JP | 2011-110215 A | 6/2011 |
| JP | 2016-161835 A | 9/2016 |

OTHER PUBLICATIONS

Tohoku University Innovative Research Organization, "Success in Development of Blood State Monitoring Device 'Magic Mirror,'" [online], Sep. 27, 2016, <URL:http://www.tohoku.ac.jp/japanese/newimg/pressimg/tohokuuniv-press20160927_01web.pdf> (Year: 2016).*

* cited by examiner

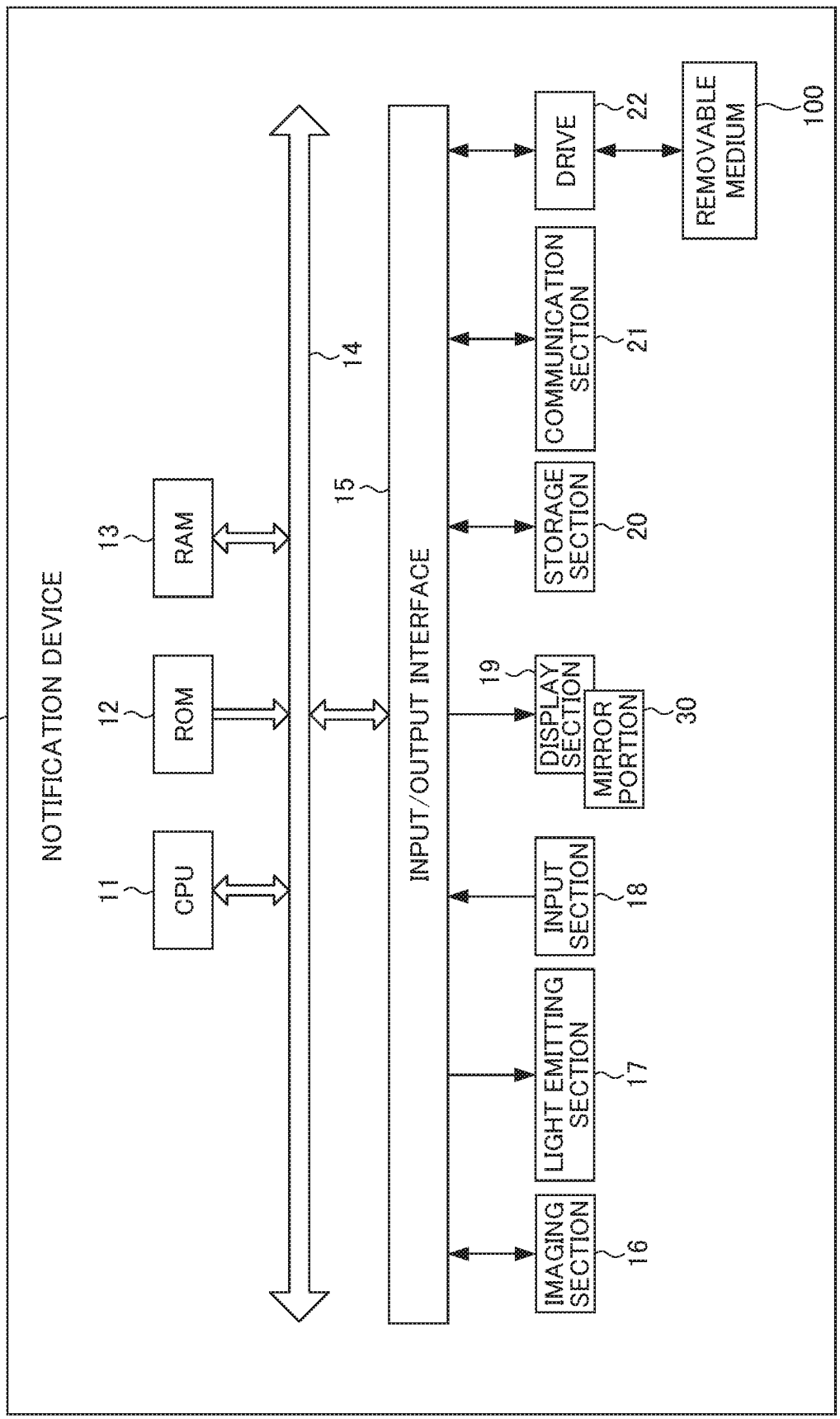

A=B⇒TRAVERSE FRONT

A>B⇒RIGHT

A<B⇒LEFT

C+D=MAXIMUM⇒VERTICAL FRONT
C/D=E⇒RATIO OF VERTICAL FRONT

C/D >E⇒UPWARD

C/D <E⇒DOWNWARD

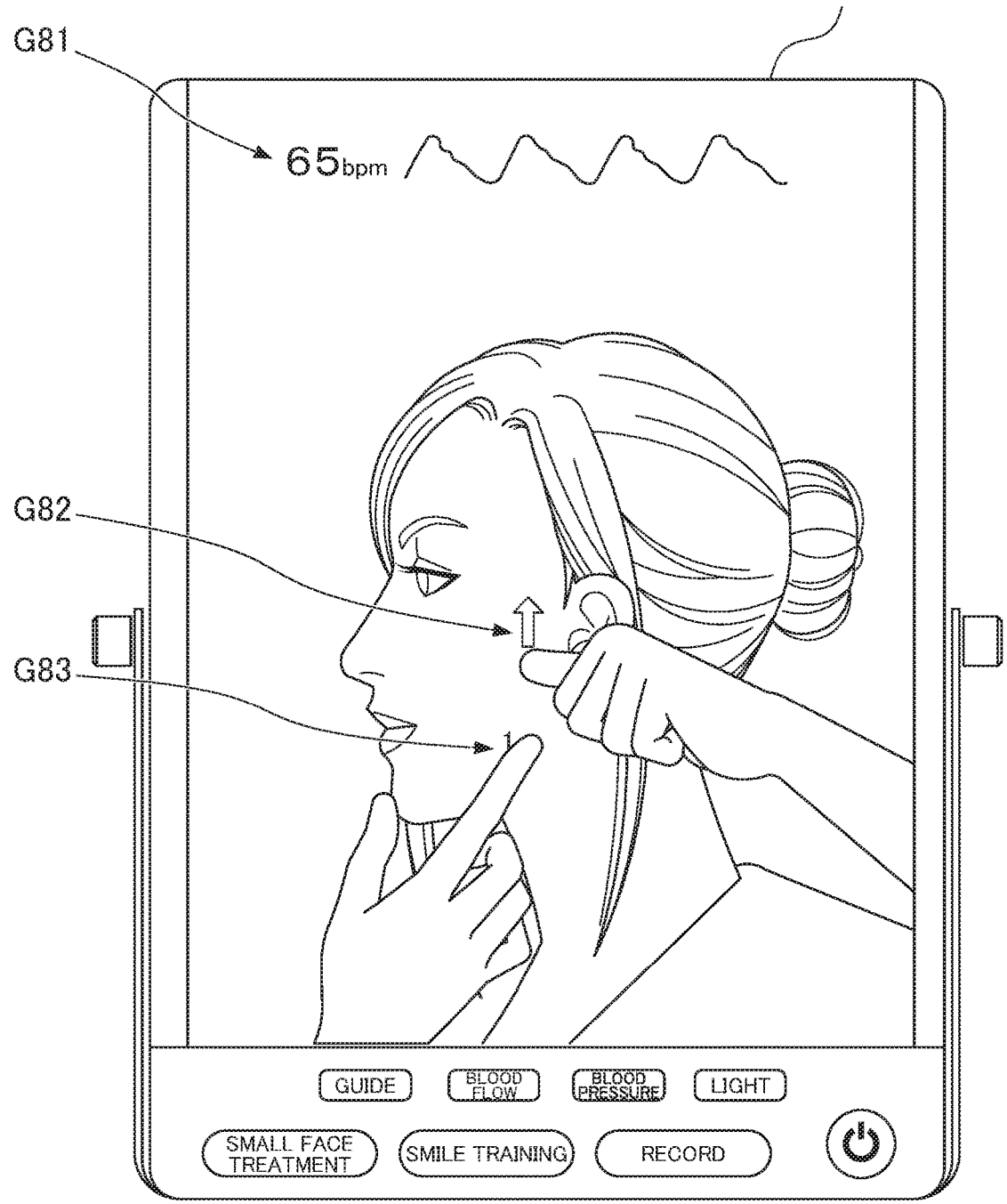

NOTIFICATION DEVICE, NOTIFICATION METHOD, AND RECORDING MEDIUM HAVING NOTIFICATION PROGRAM STORED THEREIN

CROSS-REFERENCE TO RELATED APPLICATIONS

This application is based upon and claims the benefit of priority under 35 USC 119 of Japanese Patent Application No. 2018-054464 filed on Mar. 22, 2018, the entire disclosure of which, including the description, claims, drawings, and abstract, is incorporated herein by reference in its entirety.

BACKGROUND OF THE INVENTION

Field of the Invention

The present invention relates to a notification device, a notification method, and a recording medium having a notification program stored therein.

Related Art

In recent years, display devices in which a mirror image of a subject and predetermined notification content are displayed in a superimposed manner have been known.

For example, a display section constituted by a liquid crystal display or the like is arranged on a deep side of a mirror portion constituted by a transmissive half mirror, and thus predetermined notification content displayed on the display section and a mirror image reflected on the mirror portion can be displayed in a superimposed manner as in JP 2016-161835 A.

SUMMARY OF THE INVENTION

One aspect of the present invention is a notification device comprising: a memory; and a processor, wherein the processor executes a program stored in the memory to perform operations comprising: sequentially detecting a face state of a subject on the basis of images which are sequentially input; giving notification of face guidance information; determining whether or not the sequentially detected face state satisfies a state corresponding to the notified face guidance information; and controlling the notification to notify another face guidance information different from the notified face guidance information in a case in which it is determined that the sequentially detected face state satisfies the state corresponding to the notified face guidance information.

BRIEF DESCRIPTION OF THE DRAWINGS

FIG. 4 is a block diagram illustrating a hardware configuration of a notification device according to an embodiment of the present invention.

FIG. 13 is a schematic diagram illustrating a fourth example of display of face guidance information in a notification control process executed by a notification device according to an embodiment of the present invention.

DETAILED DESCRIPTION OF THE INVENTION

Hereinafter, an exemplary embodiment of the present invention will be described with reference to the appended drawings.

A notification device 1 according to an embodiment of the present invention is configured as a self-standing mirror which can be carried by a user.

The notification device 1 performs a series of pieces of guidance by switching a plurality of pieces of face guidance information and giving a notification to a user viewing a mirror.

For example, the notification device 1 performs a series of pieces of guidance related to face massage or the like.

In this case, the notification device 1 captures a user as a subject and detects a state of a face or the like of the captured user by face tracking.

The notification device 1 switches face guidance information to be notified in a case in which the detected state of the user satisfies a predetermined condition.

According to the notification device 1, unlike a common technique, it is possible to eliminate the need for the user to perform a manipulation such as a touch manipulation in order to control predetermined notification content (for example, in order to switch predetermined notification content).

In other words, according to the notification device 1, the notification device which gives notification of predetermined information can be more conveniently used.

[System Configuration]

Figure 1:
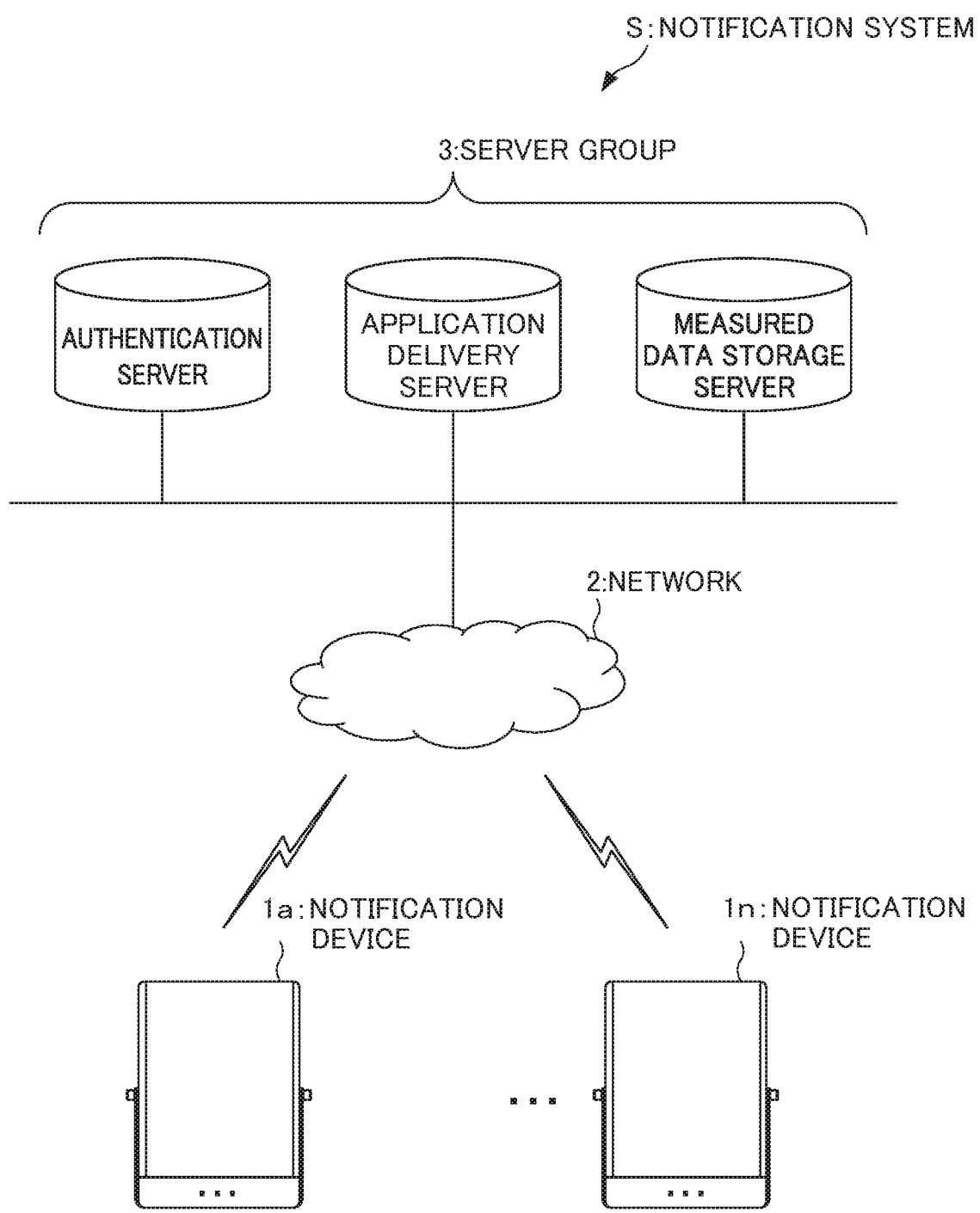
FIG. 1 is a block diagram illustrating a configuration of a notification system according to an embodiment of the present invention.

FIG. 1 is a block diagram illustrating an overall configuration of a notification system S including the notification device 1 according to the present embodiment.

As illustrated in FIG. 1, the notification system S includes a plurality of notification devices 1, a network 2, and a server group 3.

The number of notification devices 1 is not particularly limited, and n notification devices 1 (n is an arbitrary natural number) may be included in the notification system S. In the following description, in a case in which n notification devices 1 are described without being particularly distinguished from each other, they are referred to simply as a "notification device 1" by omitting a letter at the end of a reference numeral.

The notification device 1 is a device that performs a series of pieces of guidance by switching a plurality of pieces of face guidance information on the basis of a state of the user and giving a notification as described above.

The notification device 1 is connected to each of servers included in a server group 3 via a network 2 so that communication can be performed therebetween.

The network 2 is realized by, for example, the Internet, a local area network (LAN), a mobile phone network, or a network in which these networks are combined.

Various types of servers cooperating with the notification device 1 are included in the server group 3. For example, the server group 3 includes an authentication server that authenticates the user of the notification device 1.

Further, for example, the server group 3 includes an application delivery server that delivers application software for realizing a function of the notification device 1.

Further, for example, the server group 3 includes a measured data storage server that stores profile information of the user which is information including setting information related to the user, a use history of the notification device 1 by the user, and the like.

Here, this is merely an example, and servers having other functions may be included in the server group 3.

Further, a plurality of servers included in the server group 3 may be realized by separate server devices, respectively, or may be realized by a single server device.

[External Configuration]

Figure 2:
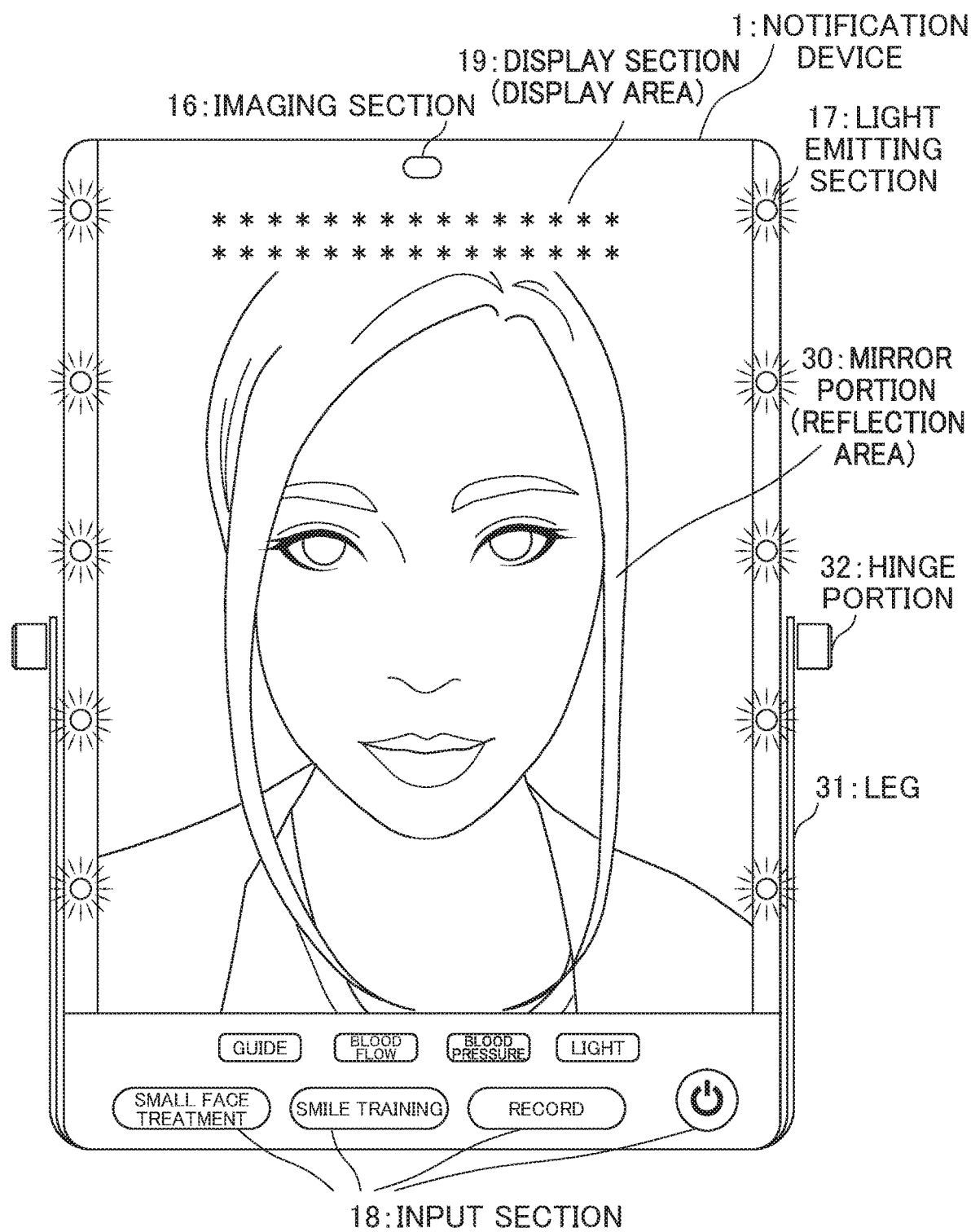
FIG. 2 is a configuration diagram illustrating an external configuration on a front surface of a notification device according to an embodiment of the present invention.

FIG. 2 is a configuration diagram illustrating an external configuration of a front surface of the notification device 1 according to an embodiment of the present invention. Further, FIGS. 3(A) and 3(B) are configuration diagrams illustrating an external configuration of a side surface of the notification device 1.

The front surface of the notification device 1 is, for example, formed with an A4 size specified in International Organization for Standardization (ISO) 216.

Figure 3A:
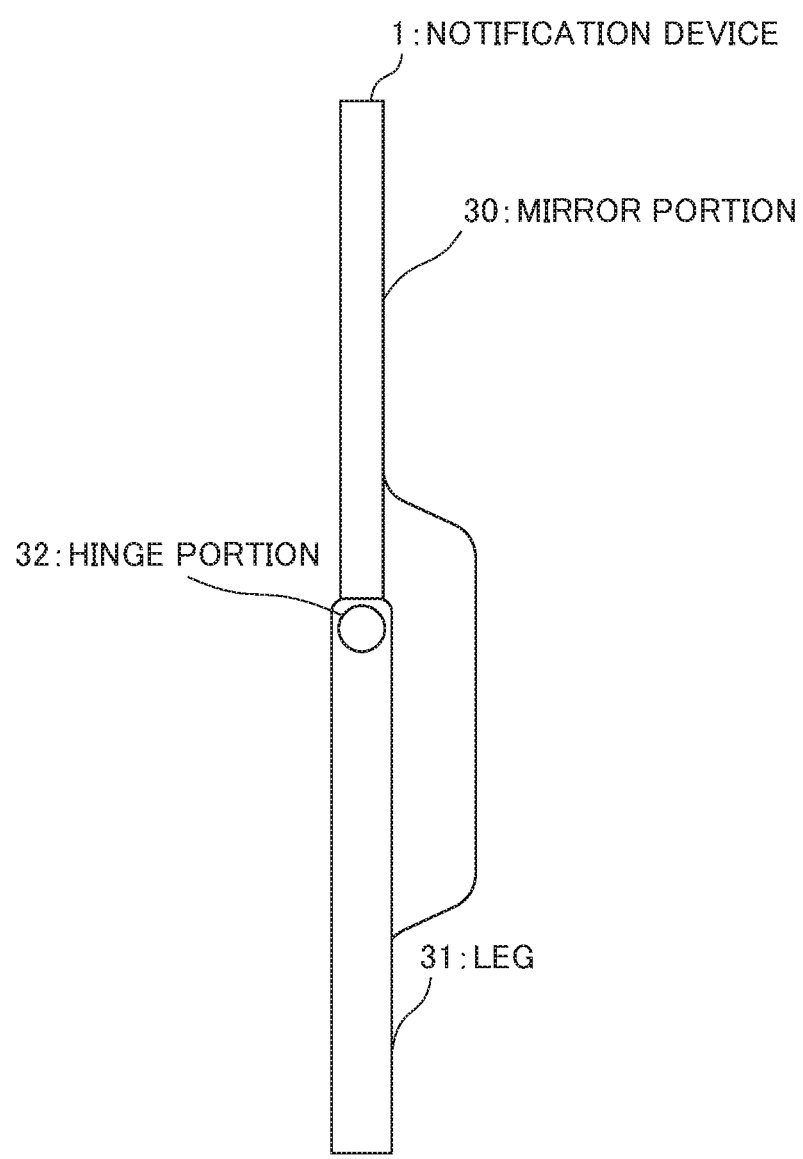
FIGS. 3A and 3B are configuration diagrams illustrating an external configuration on a side surface of a notification device according to an embodiment of the present invention.
Figure 3B:
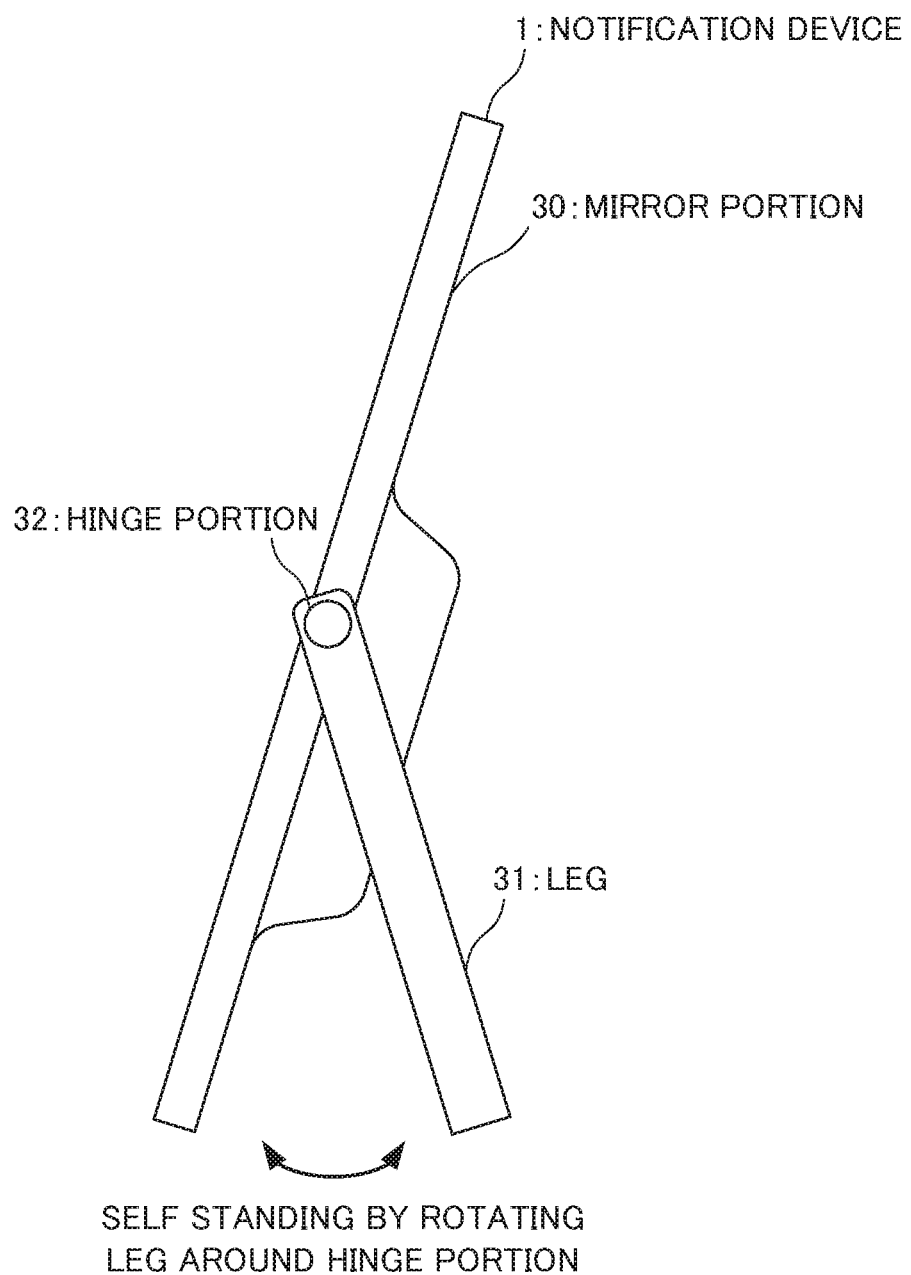

As illustrated in FIGS. 2, 3(A) and 3(B), the notification device 1 includes a mirror portion 30 and a leg 31.

The mirror portion 30 is a mirror.

The leg 31 and a hinge portion 32 are mechanisms for causes the notification device 1 to self-stand.

The leg 31 is pivotally joined to the mirror portion 30 by the hinge portion 32.

As illustrated in FIG. 3(A), when the notification device 1 is carried, the side surface of the mirror portion 30 and the side surface of the leg 31 are aligned, so that the user can carry the notification device 1 in a non-bulky shape.

On the other hand, as illustrated in FIG. 3(B), when the notification device 1 is installed and used on a desk or the like, the user can cause the notification device 1 to self-stand by causing the leg 31 to turn around the hinge portion 32.

In order to cause the notification device 1 to be able to self-stand, the hinge portion 32 has a structure for holding the leg 31 in a state in which a predetermined angle is maintained.

The notification device 1 further includes a light emitting section 17, an input section 18, and a display section 19 as components appearing on the appearance as illustrated in FIG. 2.

The light emitting section 17 is a section that emits light to illuminate the user facing the mirror portion 30. As the user is illuminated by the light emitting section 17, the notification device 1 functions as a mirror with illumination lamps.

The light emitting sections 17 are arranged at a plurality of positions on both ends of the mirror portion 30 respectively. Here, for the sake of convenience of illustration, in FIG. 2, only one light emitting section 17 is denoted by a reference numeral, and the other light emitting sections 17 are not denoted by reference numerals.

The input section 18 is a section which receives a manipulation input by the user.

The input section 18 is realized by, for example, a plurality of buttons.

In FIG. 2, buttons for switching to various types of modes such as small face treatment, smile training, and biometric information recording, and a button for powering on/off the notification device 1 are illustrated as an example.

The display section 19 is a section that notifies the user of various types of information by displaying various types of information.

The display section 19 displays a message such as characters, an image, or the like.

In the notification device 1, the reflecting surface of the reflecting portion constituting the mirror portion 30 and the display surface of the display section 19 are arranged superimposed in a viewing direction of the user facing the mirror portion 30 so that they are visible at the same time from the user.

For example, the display section 19 constituted by a liquid crystal display is arranged to overlap in parallel on a deep side of the mirror portion 30 constituted by a half mirror in the viewing direction.

With such an arrangement, the user can view his/her face reflected by the mirror portion 30 and information displayed on the display section 19 at the same time.

In the example of FIG. 2, a display area of the display section 19 is formed an upper portion of a screen, and a reflection area of the mirror portion 30 is formed a lower portion of the screen.

The notification device 1 further includes an imaging section 16.

The imaging section 16 is a section that captures the user facing the mirror portion 30 as a subject when the notification device 1 is used.

The imaging section 16 is placed at a position at which a facial image of the user facing the mirror portion 30 can be captured.

The external structure of the notification device 1 has been described above.

Here, this structure is merely an example, and an external structure of the notification device 1 is not limited to this example.

Further, for example, the light emitting section 17 may be arranged in the upper or lower portion of the mirror portion 30 or may be arranged on the entire periphery of the mirror portion 30.

Further, for example, the number of input sections 18 or the arrangement of the input sections 18 may be changed.

Further, for example, a part of the display section 19 may be configured as a touch panel, and the input section 18 and the display section 19 may be integrally configured.

Further, for example, the display area realized by the display section 19 may be arranged in the upper portion of the screen but may be arranged at any other position.

For example, the display area may be arranged on the periphery of the central portion of the mirror portion 30 while assuming that the face of the user is reflected on the central portion of the mirror portion 30.

Further, for example, the mirror portion 30 may be arranged on a portion of the front surface of the notification device 1, and the display section 19 may be arranged on another portion of the front surface.

In other words, the mirror portion 30 and the display section 19 need not be necessarily arranged to overlap each other.

Further, for example, instead of constituting the mirror portion 30 by a half mirror and constituting the display section 19 by a common liquid crystal display as described above, the mirror portion 30 may be constituted by a common mirror, and the display section 19 may be constituted by a transmissive liquid crystal display.

In this case, it is desirable that the mirror portion 30 constituted by a common mirror be arranged to overlap in parallel on a deep side of the display section 19 constituted by a transmission liquid crystal display in the viewing direction.

Further, for example, the imaging section 16 may be arranged to overlap in parallel with the display section 19 on a deep side of the mirror portion 30 constituted by a half mirror in the viewing direction, similarly to the display section 19.

[Hardware Configuration]

FIG. 4 is a block diagram illustrating a hardware configuration of the notification device 1.

As illustrated in FIG. 4, the notification device 1 includes a central processing unit (CPU) 11, a read only memory (ROM) 12, a random access memory (RAM) 13, a bus 14, an input/output interface 15, an imaging section 16, a light emitting section 17, an input section 18, a display section 19, a storage section 20, a communication section 21 and a drive 22.

The CPU 11 executes various processings according to a program recorded in the ROM 12, or a program loaded in the RAM 13 from the storage section 20.

Data or the like necessary for the CPU 11 to execute various processings, is also suitably stored in the RAM 13.

The CPU 11, the ROM 12, and the RAM 13 are connected to each other through the bus 14.

In addition, the input/output interface 15 is also connected to the bus 14.

The imaging section 16, the light emitting section 17, the input section 18, the display section 19, the storage section 20, and the drive 22 are connected to the input/output interface 15.

Although not illustrated, the imaging section 16 includes an optical lens unit and an image sensor.

The optical lens unit includes a lens such as, for example, a focus lens, a zoom lens, or the like that collects light in order to photograph a subject.

The focus lens is a lens that forms a subject image on a light receiving surface of the image sensor.

The zoom lens is a lens that causes a focal length to be freely changed within a certain range.

Further, a peripheral circuit for adjusting setting parameters such as focus, exposure, white balance, and the like is installed in the imaging section 16 if necessary.

The image sensor is configured of a photoelectric conversion element, an analog front end (AFE), or the like. The photoelectric conversion element, for example, is configured of a complementary metal oxide semiconductor (CMOS) type photoelectric conversion element or the like.

The subject image is incident on the photoelectric conversion element from the optical lens unit.

Then, the photoelectric conversion element performs photoelectric conversion (imaging) with respect to the subject image, accumulates an image signal for a constant time, and sequentially supplies the accumulated image signals to the AFE, as an analog signal.

The AFE executes various signal processings such as analog/digital (A/D) conversion processing, with respect, to the analog image signal.

A digital signal is generated by the various signal processings, and is output as an output signal from the imaging section 16.

Such output signal from the imaging section 16 is appropriately supplied to the CPU 11 or the like.

The light emitting section 17 includes light emitter such as light emitting diodes (LEDs) corresponding to respective colors in an RGB color model and a control circuit capable of controls the light emitter.

By controlling the light emitters, the control circuit adjusts color components in light emission of the light emitters on the basis of illuminance or the RGB color model.

The light emitting section 17 illuminates the user by adjusting the color components of RGB to a predetermined state and emitting light together with activation of the notification device 1.

The predetermined state is, for example, a state in which the face of the user reflected on the mirror portion 30 looks naturally.

Further, for example, the light emitting section 17 emits light while adjusting illuminance or the color components on the basis of an instruction from the CPU 11 so that the state of the face of the user or the like can be easily detected.

The input section 18 includes various types of buttons or the like, and inputs various types of information in accordance with an instruction manipulation or an instruction voice of the user.

The display section 19 includes a liquid crystal display or the like, and displays an image corresponding to image data output from the CPU 11.

The mirror portion 30 includes a half mirror and, for example, reflects the face of the user.

The arrangement of the display section 19 and the mirror portion 30 is performed as described above with reference to FIG. 2.

The storage section 20 includes a semiconductor memory such as a dynamic random access memory (DRAM) and stores various types of data.

In the communication section 21, the CPU 11 performs communication control for performing communication with other devices (for example, the servers included in the server group 3) via the network 2.

The drive 22 is constituted by an interface onto which a removable medium 100 can be loaded.

The removable medium 100 including a magnetic disk, an optical disk, a magneto-optical disk, a semiconductor memory or the like is properly loaded onto the drive 22.

The removable medium 100 stores a program for executing a notification control process to be described later or various types of data such as image data.

The program or various types of data such as image data read from the removable medium 100 by the drive 22 is installed in the storage section 20 if necessary.

The notification device 1 may further include another hardware in addition to the hardware described above.

For example, the notification device 1 includes a lamp, a speaker, a vibration motor, or the like, and may include an output section that outputs light, a sound, or a vibration signal.

[Functional Configuration]

Figure 5:
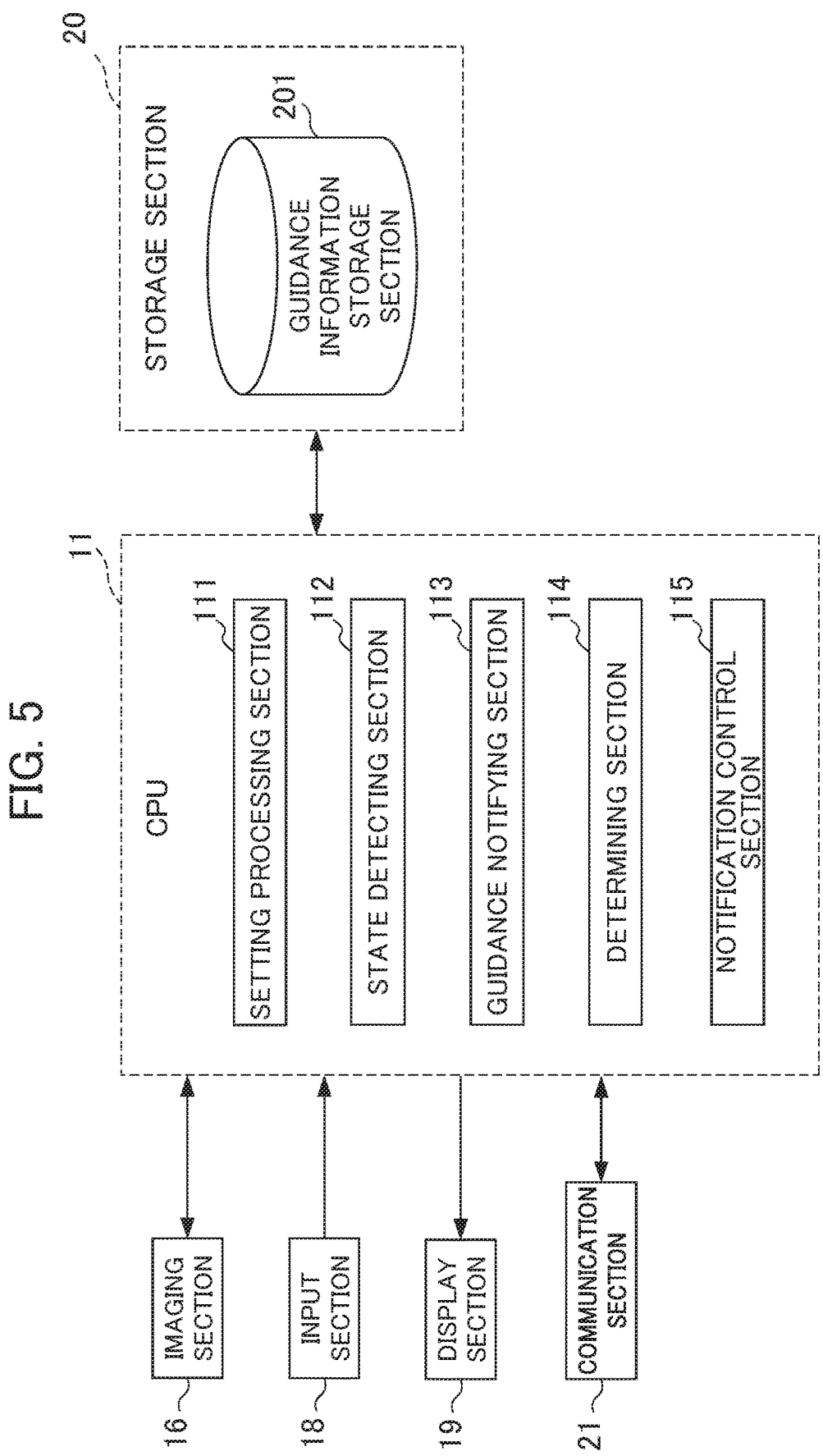
FIG. 5 is a functional block diagram illustrating a functional configuration for executing a notification control process in a functional configuration of a notification device according to an embodiment of the present invention.

FIG. 5 is a functional block diagram illustrating a functional configuration for executing the notification control process in a functional configuration of the notification device 1.

The notification control process is a process in which the notification device 1 performs a series of pieces of guidance by switching a plurality of pieces of face guidance information and giving a notification.

In a case in which the notification control process is executed, a setting processing section 111, a state detecting section 112, a guidance notifying section 113, a determining section 114, and a notification control section 115 function in the CPU 11 as illustrated in FIG. 5.

A face guidance information storage section 201 is set in an area of the storage section 20.

The face guidance information storage section 201 stores various types of data related to the notification control process.

For example, the face guidance information storage section 201 stores image data, text data, audio data, and the like for generating the face guidance information to be notified in the notification control process.

The face guidance information storage section 201 also stores a notification order of a plurality of pieces of face guidance information in a series of pieces of guidance, a condition for switching the face guidance information for notification, to next face guidance information, data for generating various types of user interfaces, and the like.

Further, the face guidance information storage section 201 stores profile information of the user generated with respect to the notification control process.

Each piece of information stored in the face guidance information storage section 201 may be stored only in the storage section 20 but may be appropriately stored in the removable medium 100 by the drive 22.

Further, each piece of information stored in the face guidance information storage section. 201 may be appropriately stored in measured data included in the server group 3.

The setting processing section 111 is a section that performs control such as settings related to the notification control process.

For example, the setting processing section 111 acquires application software for performing the notification control process from the application delivery server included in the server group 3 and causes the application software to operate. Further, for example, the setting processing section 111 authenticates the user performing the notification control process by performing communication with the authentication server included in the server group 3.

Further, for example, the setting processing section 111 updates the profile information of the user in the notification control process by performing communication with the measured data storage server included in the server group 3.

The state detecting section 112 is a section that detects the state of the face of the user or the like in the notification control process.

To this end, the state detecting section 112 analyzes an image which is captured by the imaging section 16 and includes the user as the subject and detects the state of the user included in the image.

For example, the state detecting section 112 performs a process related to face tracking such as pattern matching of contours or parts or skin color identification on the facial image including the face of the user, recognizes a face contour, an eye position, or a skin area, and detects a predetermined area such as a forehead, a cheek, a chin, and a neck.

Then, the state detecting section 112 detects the state of the face of the user or the like on the basis of the detected predetermined area.

In the present embodiment, as an example, the state detecting section 112 sequentially detects a face angle of the user (that is, a face direction of the user) viewing the display section 19 and the mirror portion 30 on the basis of a position relation of the detected predetermined area.

A method of detecting the face direction of the user through the state detecting section 112 will be described later with reference to FIGS. 6A to 6C and FIGS. 7A to 7C.

Further, the state detecting section 112 may also measure biometric information (also referred to as vital data) of the user in a non-contact manner without actually touching the user.

In this case, the detected predetermined area corresponds to a region of interest (ROI) from which the biometric information is acquired in a non-contact manner.

Then, the state detecting section 112 performs measurement, for example, by analyzing components in the vicinity of a heartbeat frequency on the basis of a green signal absorbed by subcutaneous blood hemoglobin in this region of interest.

The biometric information measured by the state detecting section 112 is, for example, a pulse, a pulse wave, a blood flow, or the like.

Further, the state detecting section 112 may perform measurement on an image of one region of interest but may perform measurement on images of a plurality of regions of interest.

In this case, for example, the state detecting section 112 can measure a pulse wave propagation speed or a variation in blood pressure correlated with a pulse wave propagation speed by performing measurement on the regions of interest of distant two points (for example, a cheek and a forehead, a forehead or a cheek and a palm, or the like) at which a pulse delay appears.

Further, the state detecting section 112 may perform an averaging process by performing noise removal or the like on the measured biometric information.

For example, the measurement of the biometric information by the state detecting section 112 can be performed using a technique described in the following reference document.

REFERENCE DOCUMENT

Tohoku university Cyber science center Advanced information technology research division, Tohoku university Innovative innovation research organization, "Success in Development of Blood State Monitoring Device "Magic Mirror,"" [online], Sep. 27, 2016, [searched on Dec. 15, 2017], Internet <URL:http://www.tohoku.ac.jp/japanese/ newing/pressing/tohokuun
iv-press20160927_01web.pdf>

The state detecting section 112 sequentially outputs the state of the face or the like of the user (here, the face direction as an example) which is detected sequentially to the notification control section 115.

The guidance notifying section 113 is a section that switches a plurality of pieces of face guidance information and gives a notification in the notification control process. The guidance notifying section 113 reads the face guidance information from the face guidance information storage section 201 on the basis of the control of the notification control section 115.

Further, the guidance notifying section 113 gives notification of the read face guidance information on the basis of the control of the notification control section 115.

In the present embodiment, as an example, the guidance notifying section 113 reads the face guidance information including image data or text data, and gives a notification by displaying an image or a text generated from the read face guidance information on the display section 19.

Specifically, for example, the guidance notifying section 113 automatically arranges and displays a direction in which the user faces or a method of a massage with an image or a text in a series of pieces of guidance in an area not overlapping with a position at which the face of the user is reflected (that is, an area not superimposing on the face of the user).

Furthermore, for example, the guidance notifying section 113 automatically arranges and displays wave data, necessary letters, or image information for giving notification of the biometric information in an area not overlapping with a position at which the face of the user is reflected (that is, an area not superimposing on the face of the user).

The guidance notifying section 113 can give or perform a series of pieces of guidance to the user easily and appropriately by redesigning and displaying such information in real time.

Alternatively, for example, the guidance notifying section 113 may display information superimposed on a position at which the face of the user is reflected.

For example, the face guidance information may be displayed using computer graphics (CG) indicating an arrow or a speech balloon.

Further, the guidance notifying section 113 may cause these displays to be combined.

For example, the guidance notifying section 113 may display a text indicating content of a massage in an area not overlapping with a position at which the face of the user is reflected and display information such that an arrow indicating a motion of the hand at the time of massage is superimposed on the position at which the face of the user is reflected.

Further, the notification by the display is an example of a notification method, and the guidance notifying section 113 may be configured to give a notification by other methods. For example, the guidance notifying section 113 may read the face guidance information including the audio data and give a notification by outputting a sound or music generated from the read face guidance information from a speaker.

Furthermore, for example, the guidance notifying section 113 may give a notification by causing a light emission state by the light emitting section 17 to be changed.

The determining section 114 determines whether or not the state of the face or the like of the user input from the state detecting section 112 satisfies a state corresponding to the notified face guidance information.

The notification control section 115 is a section that controls the notification performed by the guidance notifying section 113 in the notification control process.

The notification control section 115 implements a series of pieces of guidance by switching a plurality of pieces of face guidance information on the basis of a determination result of the determining section 114 and causing the guidance notifying section 113 to give a notification.

Specifically, the notification control section. 115 reads the notification order of a plurality of pieces of face guidance information in a series of pieces of guidance or a condition for switching the face guidance information to be notified to the next face guidance information (hereinafter referred to as a "transition condition") from the face guidance information storage section 201.

Further, in a case in which the determining section 114 determines that the state of the face or the like of the user input from the state detecting section 112 satisfies the state corresponding to the notified face guidance information, the notification control section 115 controls the guidance notifying section 113 such that another face guidance information different from the notified face guidance information is notified.

The transition condition corresponding to the face guidance information can be determined variously.

For example, a transition condition that the state of the face or the like of the user detected by the guidance notifying section 113 becomes a state corresponding to the notified face guidance information can be used as the transition condition. In the present embodiment, since the face direction of the user is detected as an example, a transition condition that the face guidance information is switched in a case in which the face direction of the user detected by the guidance notifying section 113 becomes a face direction corresponding to the notified face guidance information is used as the transition condition.

Here, the transition condition is not limited thereto, and for example, a condition that a predetermined period of time elapses since the face guidance information is notified, a condition that the biometric information detected by the state detecting section 112 reaches a predetermined value, or the like may be used as the transition condition.

The transition condition is stored in the face guidance information storage section 201 in association with the corresponding face guidance information.

[Detection of Face Direction]

The detection of the face angle (that is, the face direction of the user) of the user by the state detecting section 112 will be described with reference to FIGS. 6A to 6C and FIGS. 7A to 7C.

Figure 6A:
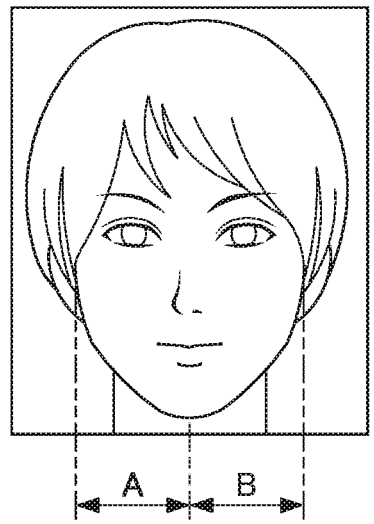
FIGS. 6A to 6C are first schematic diagrams illustrating a method of detecting a face direction of a subject through a state detecting section of a notification device according to an embodiment of the present invention.
Figure 6B:
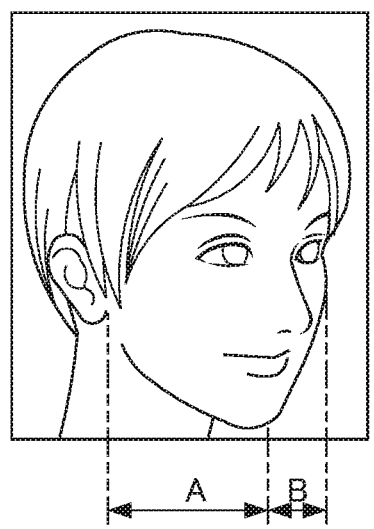
Figure 6C:
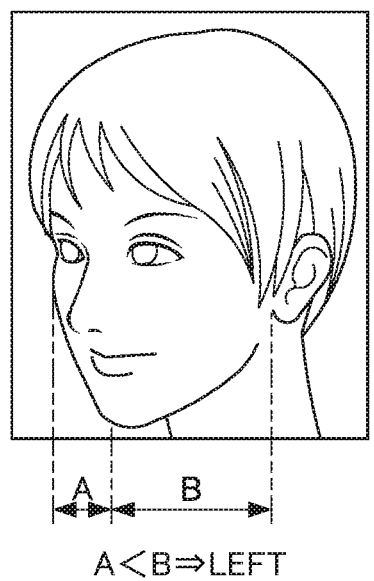

FIGS. 6A to 6C are schematic diagrams illustrating a method of detecting the face direction of the subject in a traverse direction.

Figure 7A:
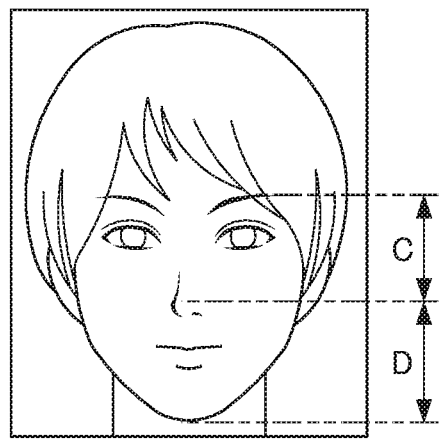
FIGS. 7A to 7C are second schematic diagrams illustrating a method of detecting a face direction of a subject through a state detecting section of a notification device according to an embodiment of the present invention.
Figure 7B:
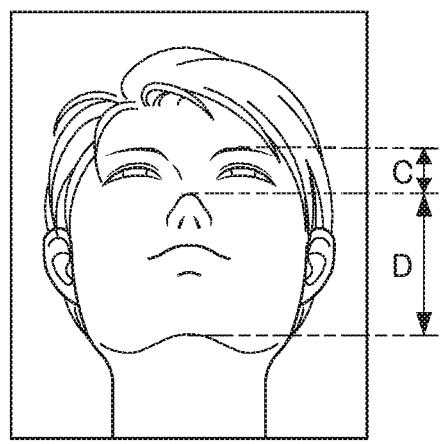
Figure 7C:
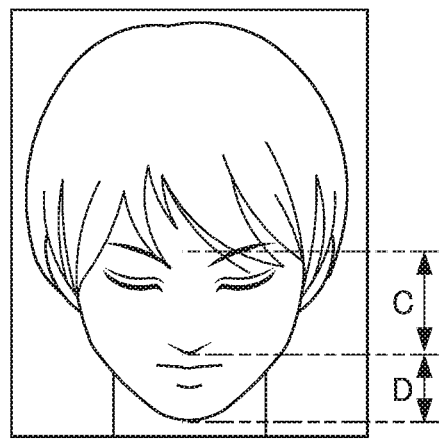

FIGS. 7A to 7C are schematic diagrams illustrating a method of detecting the face direction of the subject in a vertical direction.

As described above, the state detection section 112 sequentially detects the face direction of the user viewing the display section 19 and the mirror portion 30 on the basis of a position relation of a predetermined area.

First, a method of detecting the face direction of the subject in the traverse direction (that is, the left-right direction) will be described with reference to FIGS. 6A to 6C. In the description to proceed with reference to FIGS. 6A to 6C below, the left in the mirror image is used instead of the left in the actual user.

Further, the right in the mirror image is used instead of the right in the actual user.

As a prerequisite for detecting the traverse face direction, the state detecting section 112 detects a position of an area of the nose of the user or a position of an area of the temple of the user (that is, the middle of both eyes) as a predetermined area.

Further, the state detecting section 112 detects the positions of the left and right contours of the face of the user.

Further, the state detecting section 112 calculates a distance A which is a distance from the detected position of the area of the nose of the user or the detected position of the area of the temple of the user (that is, the middle of both eyes) to the left contour of the user.

Further, the state detecting section 112 calculates a distance B which is a distance from the detected position of the area of the nose of the user or the detected position of the area of the temple of the user (that is, the middle of both eyes) to the right contour of the user.

Then, as illustrated in FIG. 6A, in a case in which the distance A and the distance B are approximately equal, the state detecting section 112 determines that the face direction of the user in the traverse direction is the front.

Further, as illustrated in FIG. 6B, in a case in which the distance A is larger than the distance B, the state detecting section 112 determines that the face direction of the user in the traverse direction is the right.

Further, as illustrated in FIG. 6C, in a case in which the distance B is smaller than the distance A, the state detecting section 112 determines that the face direction of the user in the traverse direction is the left.

The state detecting section 112 can detect the face direction of the subject in the traverse direction (that is, the left-right direction) by performing such ratio-based determination.

Further, the state detecting section 112 can measure the angle of the face of the user in traverse direction on the basis of the ratio of the distance A and the distance B in the detection of the face direction in the traverse direction.

Next, a method of detecting the face direction of the subject in the vertical direction (that is, the up-down direction) will be described with reference to FIGS. 7A to 7C. As a prerequisite for detecting the vertical face direction, the state detecting section 112 detects the position of the area of the nose of the user as a predetermined area. Further, the state detecting section 112 detects positions of the upper and lower contour of the face of the user.

Further, the state detecting section 112 calculates a distance C which is a distance from the detected position of the area of the nose of the user to the upper contour of the user.

Further, the state detecting section 112 calculates a distance D which is a distance from the detected position of the area of the nose of the user to the lower contour of the user. Then, as illustrated in FIG. 7A, in a case in which the face direction of the user in the vertical direction becomes a direction in which a size obtained by adding the distance C and the distance D is proximally maximum, the state detecting section 112 determines that the face direction of the user in the vertical direction is the front.

Further, the state detecting section 112 obtains a value of ratio when the size obtained by adding the distance C and the distance D is maximum by dividing the value of the distance C by the value of the distance D.

Further, as illustrated in FIG. 7B, in a case in which the value obtained by dividing the value of the distance C by the value of the distance D is smaller than the value of the ratio F, the state detecting section 112 determines that the face direction of the user in the vertical direction is upward. Further, as illustrated in FIG. 7C, in a case in which the value obtained by dividing the value of the distance C by the value of the distance D is larger than the value of the ratio E, the state detecting section 112 determines that the face direction of the user in the vertical direction is downward.

The state detecting section 112 can detect the face direction of the subject in the vertical direction (that is, the up-down direction) by performing such ratio-based determination.

The state detecting section 112 can also measure the angle of the face of the user in the vertical direction on the basis of the ratio of the distance C and the distance D in the detection of the face direction in the vertical direction.

Further, in both the detection of the face direction in the traverse direction described with reference to FIGS. 6A to 6C and the detection of the face direction in the vertical direction described with reference to FIGS. 7A to 7C, a threshold value may be set, and the detection may be performed. For example, a threshold value may be set in the value of the ratio of the distance A and the distance B, the value of the ratio of the distance C and the distance D, the value of the face angle of the user, or the like, and the face direction may be detected by comparing the threshold value with a currently detected value.

For example, a range of a threshold value corresponding to a predetermined range corresponding to the right direction, a range of a threshold value corresponding to a predetermined range corresponding to the left direction, and a range of a threshold value corresponding to a predetermined range corresponding to the traverse front are set for the value of the ratio between the distance A and the distance B.

Then, in a case in which the value of the ratio of the distance A and the distance B which is currently detected falls within the range of the threshold value corresponding to a certain direction, the face of the user faces may be detected as facing in the certain direction.

Both the detection of the face direction in the traverse direction described with reference to FIGS. 6A to 6C and the detection of the face direction in the vertical direction described with reference to FIGS. 7A to 7C may be performed.

[Notification Control Process]

Figure 8:
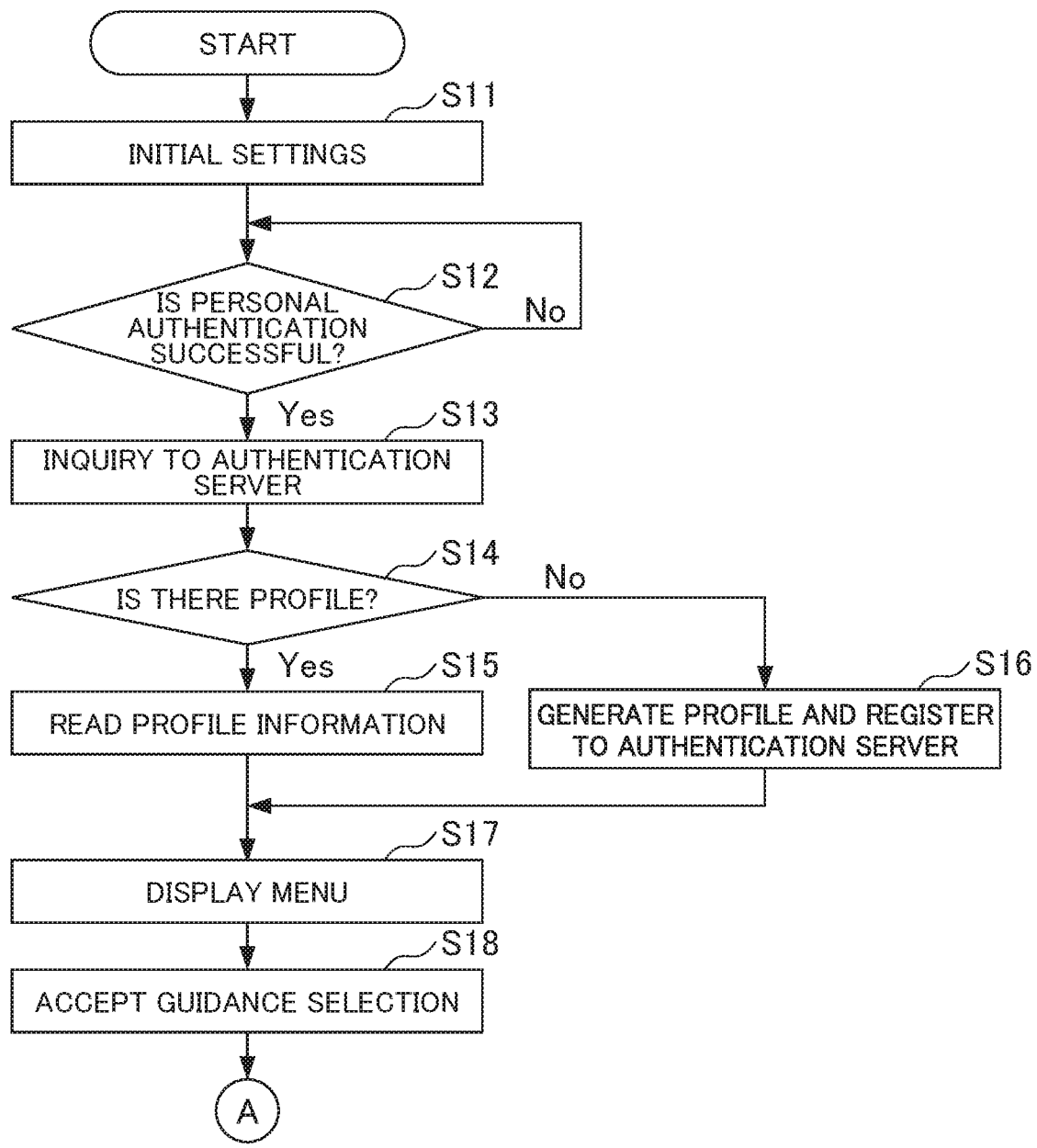
FIG. 8 is a first flowchart illustrating a flow of a notification control process executed by a notification device according to an embodiment of the present invention.
Figure 9:
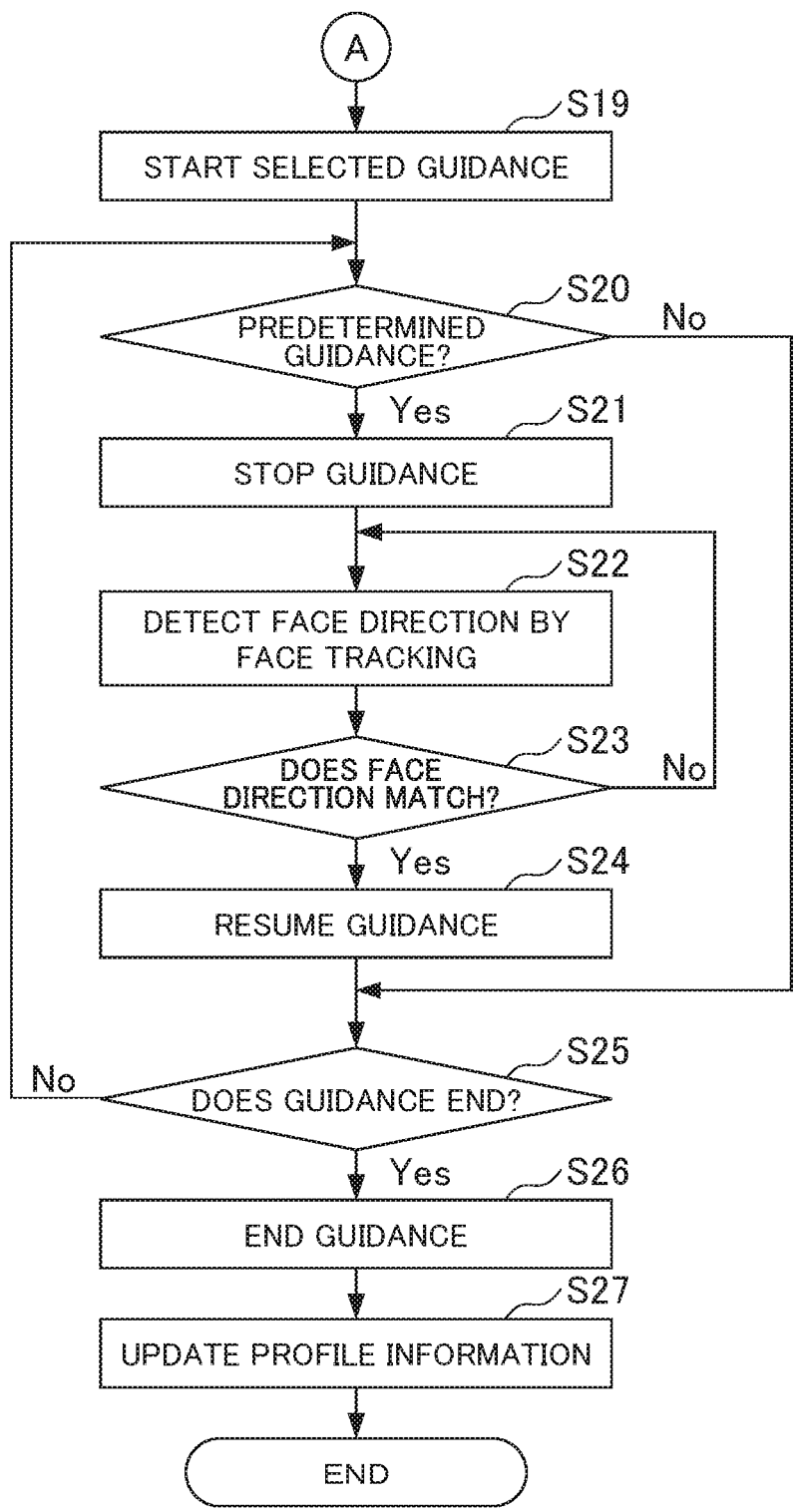
FIG. 9 is a second flowchart illustrating a flow of a notification control process executed by a notification device according to an embodiment of the present invention.

FIGS. 8 and 9 are flowcharts illustrating a flow of the notification control process executed by the notification device 1 of FIG. 1 having the functional configuration of FIG. 5.

The notification control process is started, for example, when the notification device 1 is powered on.

As illustrated in FIG. 8, in step S11, the setting processing section 111 performs initial settings.

For example, the setting processing section 111 acquires the application software for performing the notification control process from the application delivery server included in the server group 3, and causes the application software to be operated.

The setting processing section 111 performs settings of the imaging section 16 and the light emitting section 17 in accordance with the operation of the application software, and the setting processing section 111 causes the capturing by the imaging section 16 to be started and causes the light emitting section 17 to emit light.

In step S12, the setting processing section 111 attempts personal authentication for identifying the user, and determines whether or not the personal authentication is successfully performed.

In a case an which the personal authentication is successfully performed, Yes is determined in step S12, and the process proceeds to step S13.

On the other hand, in a case in which the personal authentication fails, No is determined in step S12, and step S12 is repeated.

For example, the personal authentication can be performed by face recognition using the facial image of the user captured by the imaging section 16, voiceprint recognition using a voice of the user collected by a microphone included in the input section 18, or the like.

Besides, the personal authentication may be performed by other authentication methods such as biometric authentication using predetermined biometric information or authentication using a password input from the user.

In step S13, the setting processing section 111 inquires the authentication server included in the server group 3 about the profile information of the user specified by the personal authentication.

The authentication server checks the presence or absence of the profile information of the user which is inquired.

Then, in a case in which there is profile information, the authentication server acquires the corresponding profile information from the measured data storage server included in the server group 3.

Then, the authentication server transmits the acquired profile information to the setting processing section 111 as a response to the inquiry.

On the other hand, in a case in which there is no profile information, the authentication server transmits a message indicating that there is no profile information to the setting processing section 111 as a response to the inquiry.

Here, the profile information includes setting information related to the user, the use history of the notification device 1 by the user, and the like.

Here, the information related to the user includes, for example, identification information identifying the user, information such as a name, an age, a height, a weight, or the like of the user, and an authentication source image for performing authentication.

The use history of the notification device 1 by the user includes, for example, information related to face guidance information which a process has been performed in the past based on and information such as the biometric information of the user acquired at that time.

In step S14, the setting processing section 111 checks content of the response from the authentication server.

In a case in which the content of the response from the authentication server is profile information, Yes is determined in step S14, and the process proceeds to step S15. On the other hand, in a case in which the content of the response from the authentication server indicates that there is no profile information, No is determined in step S14, and the process proceeds to step S16.

In step S15, the setting processing section 111 reads the profile information received as the response from the authentication server.

In step S16, the setting processing section 111 generates the profile information of the user which is a target of the current process, transmits the profile information to the authentication server, and makes a request to register the profile information.

The authentication server performs the registration by storing the received profile information in the measured data storage server.

In step S17, the setting processing section 111 displays a menu for performing guidance using the face guidance information.

For example, a menu including choices for selecting content of guidance for performing, for example, "small face treatment," "smile massage," "measurement of biometric information," and "makeup" is displayed on the basis of the guidance.

In step S18, the setting processing section 111 receives selection of certain guidance content from the user referring to the menu via the input section 18 or the like.

In this case, the selection of "small face treatment" is assumed to be received as an example.

The small face treatment means that the user performs a lymph massage or the like for reducing swelling of the face by a massage flowing the lymph against the face or the like of the user.

Referring to FIG. 9, in step S19, the notification control section 115 starts the guidance by causing the guidance notifying section 113 to give notification of first face guidance information in the small face treatment.

In step S20, the determining section 114 determines whether or not it is a timing at which predetermined guidance which is guidance in which the information of the state (in this case, the face direction) of the face or the like of the user is necessary to switch the face guidance information is notified.

For example, if a predetermined period of time or the like elapses from the notification of the face guidance information, and the transition condition is satisfied, it is determined whether or not it is a timing at which predetermined guidance for switching the face guidance information is notified.

In a case in which the predetermined guidance in which the information of the state of the face or the like of the user is necessary is not notified, No is determined in step S20, and the process proceeds to step S25.

On the other hand, in a case in which the predetermined guidance in which the information of the state of the face or the like of the user is necessary is notified, Yes is determined in step S20, and the process proceeds to step S21.

In step S21, the notification control section 115 stops the guidance without causing the face guidance information notification to be switched by the guidance notifying section 113.

In step S22, the guidance notifying section 113 detects the face direction of the user by the method described above with reference to FIGS. 6A to 6C and FIGS. 7A to 7C.

In step S23, the determining section 114 determines whether or not the face direction of the user detected in step S22 satisfies the transition condition.

For example, it is determined whether or not the face direction of the user detected by the guidance notifying section 113 becomes the face direction corresponding to the notified face guidance information.

In a case in which the face direction of the user detected by the guidance notifying section 113 becomes the face direction corresponding to the notified face guidance information, Yes is determined in step S23, and the process proceeds to step S24.

On the other hand, in a case in which the face direction of the user detected by the guidance notifying section 113 does not become the face direction corresponding to the notified face guidance information, No is determined in step S23, and the detection of the face direction in step S22 and the determination in step S23 are repeated at predetermined intervals.

In this case, in a case in which it is difficult to match the face direction, the process may proceed to step S24 irrespective of the determination in step S23.

In step S24, the notification control section 115 resumes the guidance by causing the face guidance information notified by the guidance notifying section 113 to be switched to another face guidance information to be notified next.

In step S25, the notification control section 115 determines whether or not the guidance ends.

For example, in a case in which a predetermined time elapses after the last face guidance information in the guidance is notified, the guidance ends.

In a case in which the guidance ends, Yes is determined in step S25, and the process proceeds to step S26.

On the other hand, in a case in which the guidance does not ends, No is determined in step S25, and the process is repeated from step S20 again.

In step S26, the notification control section 115 ends the guidance by causing the notification in the face guidance information by the guidance notifying section 113 to end.

In step S27, the setting processing section 111 updates the profile information which is stored in the face guidance information storage section 201 of the storage section 20, the measured data storage server included in the server group 3, or the like on the basis of the biometric information measured in the current guidance.

Accordingly, the notification control process ends.

In the notification control process performed in the next time and later, Yes is determined in step S14, and the process in step S16 can be omitted.

Further, in the notification control process performed next time and later, the process such as the acquisition of the application in step S11 may be omitted.

According to the notification control process described above, it is possible to eliminate the need for the user to perform a manipulation such as a touch manipulation in order to control predetermined notification content (for example, in order to switch predetermined notification content).

In other words, according to the notification device 1, the notification device that gives notification of predetermined information can be more easily used.

Next, an example of the notification actually performed in the notification control process described above will be described below.

Example of Notification

Each of FIGS. 10 to 13 is a schematic diagram illustrating an example of display performed as the notification of the face guidance information in the notification control process executed by the notification device 1.

In FIGS. 10 to 13, the illustration of the imaging section 16 and the light emitting section 17 is omitted.

Figure 10:
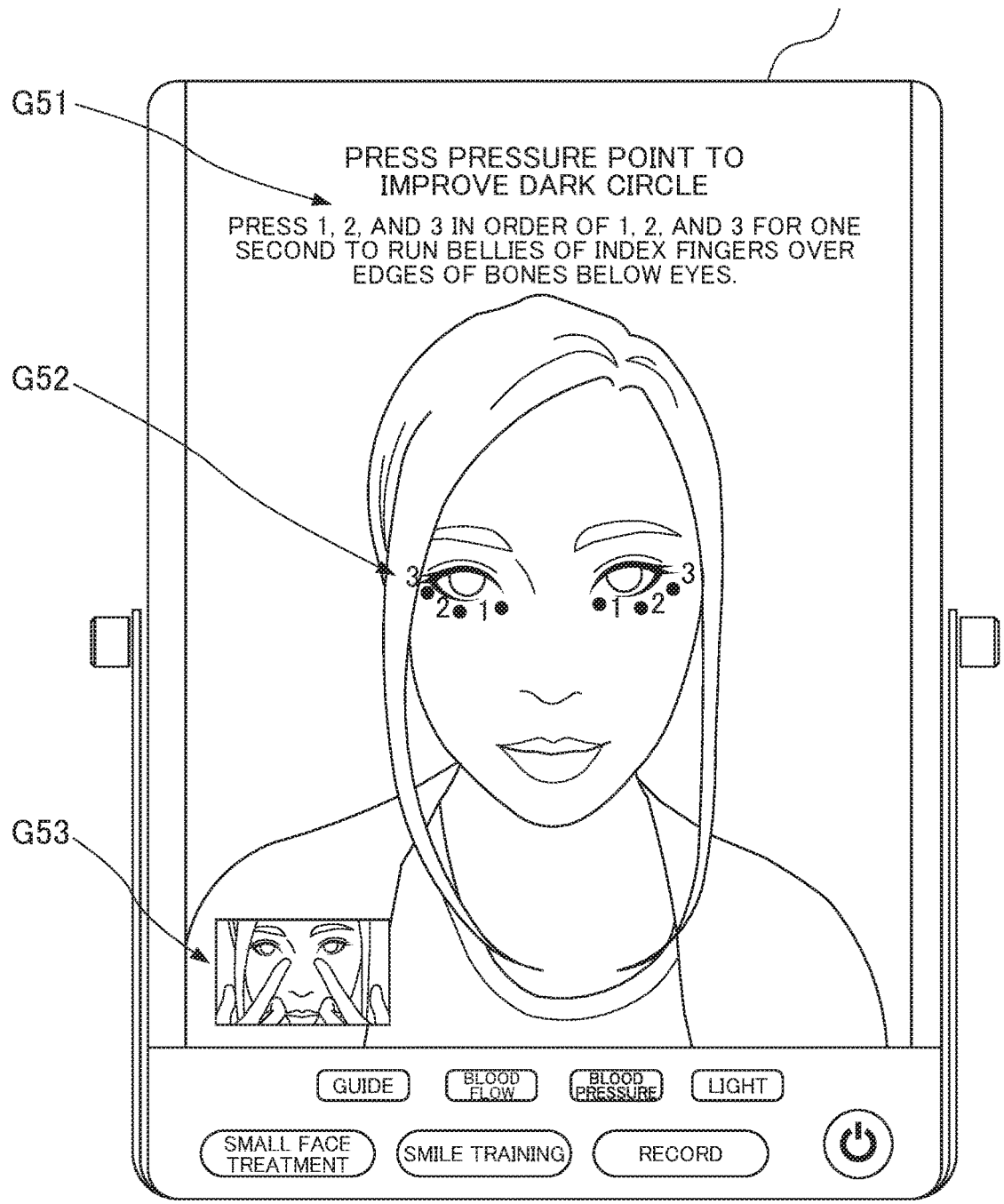
FIG. 10 is a schematic diagram illustrating a first example of display of face guidance information in a notification control process executed by a notification device according to an embodiment of the present invention.

As illustrated in FIG. 10, the guidance notifying section 113 gives notification of face guidance information G51, face guidance information G52, and face guidance information G53 as the face guidance information.

Further, the mirror image of the user facing the front, is reflected on the mirror portion 30.

The face guidance information illustrated in FIG. 10 is displayed, for example, in a case in which the transition condition is satisfied by the user facing the front.

As illustrated in FIG. 10, a text describing the method of massage is displayed as the face guidance information G51.

A point indicating a position of a pressure point to be pressed in the massage and a number assigned to the pressure point are displayed as the face guidance information G52. When the state detecting section 112 detects the contour or the like of the user, such display is displayed at a position corresponding to a pressure point in the mirror image on the basis of a detection result.

Further, an image in a case in which the pressure point is actually pressed is displayed as the face guidance information G53.

The user can easily understand how the massage should be performed with reference to the face guidance information. Thereafter, for example, the transition condition is satisfied in a case in which the face direction of the user is the front direction continuously for a predetermined period of time after the face guidance information is displayed.

Figure 11:
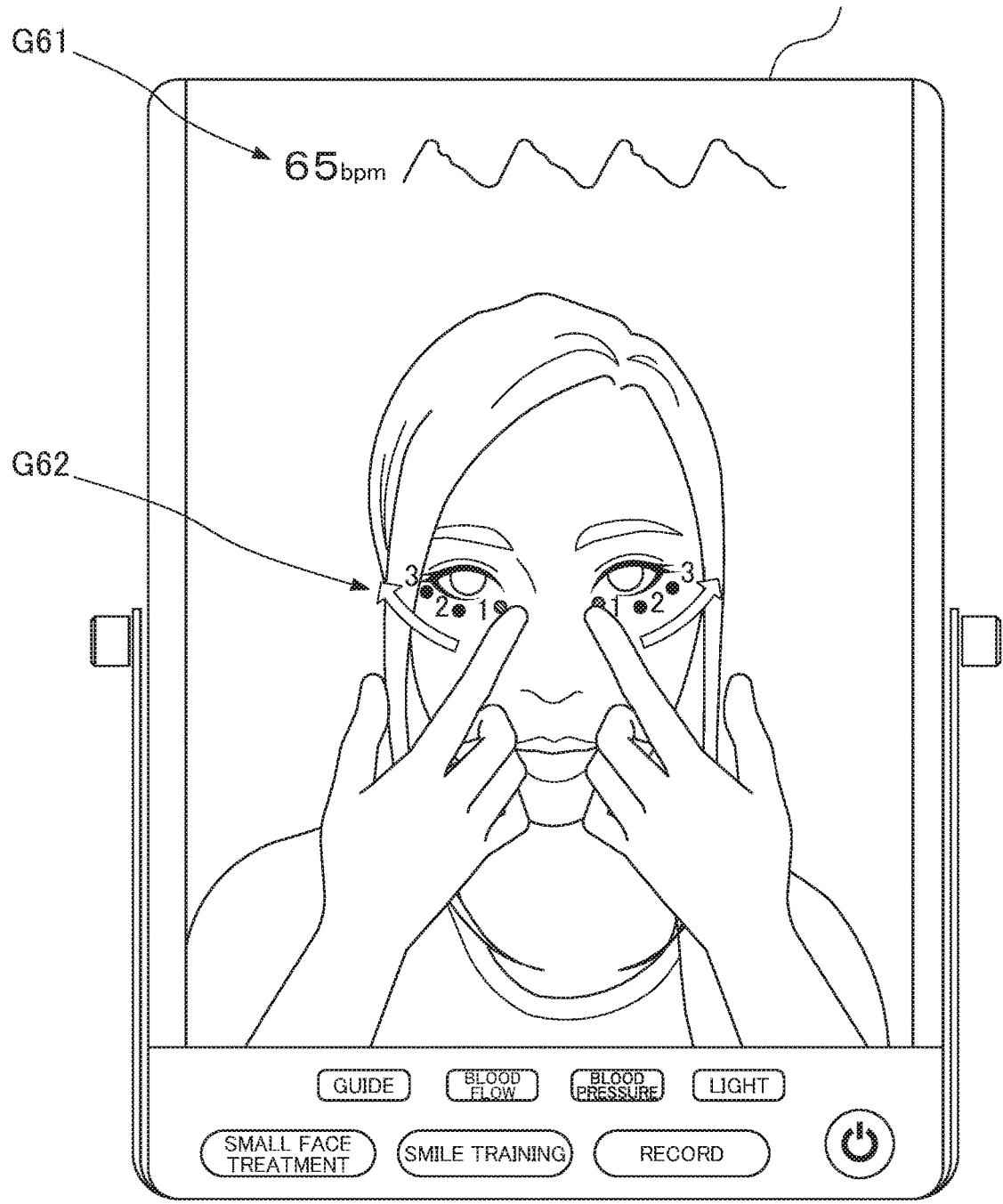
FIG. 11 is a schematic diagram illustrating a second example of display of face guidance information in a notification control process executed by a notification device according to an embodiment of the present invention.

In this case, the notification control section 115 switches the face guidance information to be notified by the guidance notifying section 113 as illustrated in FIG. 11.

As illustrated in FIG. 11, the guidance notifying section 113 gives notification of face guidance information G61 and face guidance information G62 as the face guidance information. Further, the mirror image of the user facing the front is reflected on the mirror portion 30.

As illustrated in FIG. 11, a text and a graph indicating the biometric information (for example, the pulse) of the user are displayed as the face guidance information G61.

As the face guidance information G62, similarly to the face guidance information G52, a pressure point is displayed, and an arrow indicating motion of the hand is displayed.

The user can perform the massage in accordance with the guidance with reference to the face guidance information. Thereafter, for example, the transition condition is satisfied in a case in which the face direction of the user is the front direction continuously for a predetermined period of time after the face guidance information is displayed.

In this case, the notification control section 115 switches the face guidance information to be notified by the guidance notifying section 113, and causes a voice or a text such as "Please turn sideways" to be notified.

The transition condition is satisfied in a case in which the user recognizing this notification changes the face direction, and the face direction of the user is sideways.

Figure 12:
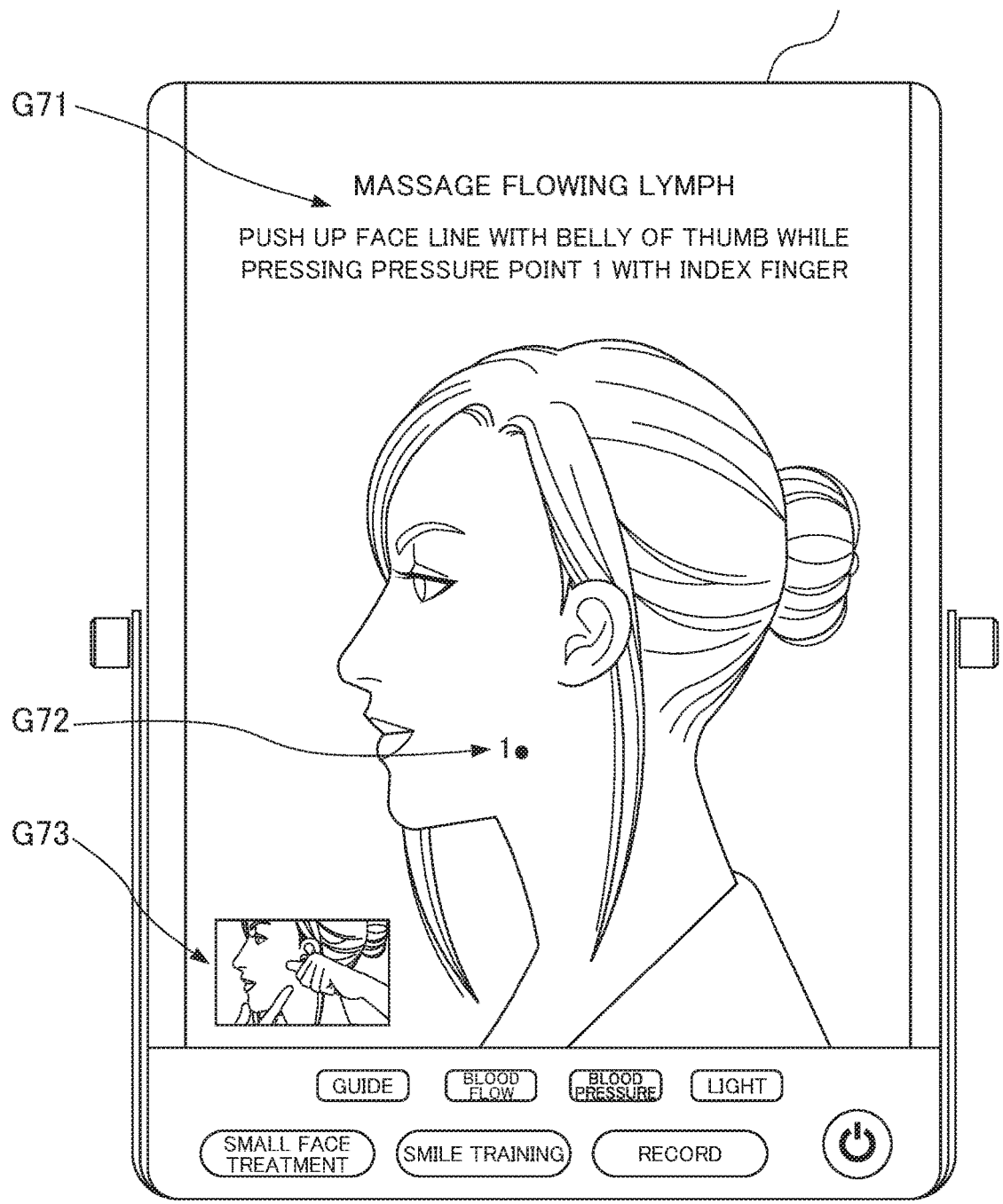
FIG. 12 is a schematic diagram illustrating a third example of display of face guidance information in a notification control process executed by a notification device according to an embodiment of the present invention.

In this case, the notification control section 115 switches the face guidance information to be notified by the guidance notifying section 113 as illustrated in FIG. 12.

As illustrated in FIG. 12, the guidance notifying section 113 gives notification of face guidance information G71, face guidance information G72, and face guidance information G73 as the face guidance information.

Further, the mirror image of the user facing left sideways is reflected on the mirror portion 30.

As illustrated in FIG. 12, a text describing the method of massage is displayed as the face guidance information G71.

A point indicating a positron of a pressure point to be pressed in the massage and a number assigned to the pressure point are displayed as the face guidance information G72. When the state detecting section 112 detects the contour or the like of the user, such display is performed at the position corresponding to the pressure point in the mirror image on the basis of a detection result.

An image in a case in which the pressure point is pushed, and the face line is pushed up is displayed as the face guidance information G73.

The user can easily understand how the massage should be performed with reference to the face guidance information. Thereafter, for example, the transition condition is satisfied in a case in which the face direction of the user is sideways continuously for a predetermined period of time after the face guidance information is displayed.

In this case, the notification control section 115 switches the face guidance information to be notified by the guidance notifying section 113 as illustrated in FIG. 13.

As illustrated in FIG. 13, the guidance notifying section 113 gives notification of face guidance information G81, face guidance information G82, and face guidance information G83 as the face guidance information.

Further, the mirror image of the user facing left sideways is reflected on the mirror portion 30.

As illustrated in FIG. 13, a text and a graph indicating the biometric information (for example, the pulse) of the user are displayed as the face guidance information G81.

Further, an arrow indicating the motion of the hand for pushing the face line upward is displayed as the face guidance information G82.

Further, a part of the face guidance information G83 is hidden with the finger of the hand in the mirror image of the user, but the pressure point is displayed as the face guidance information G83, similarly to the face guidance information 72. The user can perform the massage in accordance with the guidance with reference to the face guidance information.

As the notification is performed as described above, the user can switch the face guidance information without using the hand.

Further, the user can receive a series of pieces of guidance in the massage with reference to the face guidance information. In the related art, in order to control predetermined notification content to be displayed (for example, in order to switch predetermined notification content), it is necessary for the user to perform a manipulation such as a touch manipulation or the like, and the usability is not good, whereas according to the present invention, the user can switch the face guidance information without using the hand, so that the notification device that notifies predetermined information can be used more conveniently.

In the past, the user performs a massage with reference to a book related to massage or a video recorded in a digital versatile disk (DVD), but since display is displayed or an instruction is given unilaterally in such a medium, the user is unable to know even when the user massages using a wrong method or massages a wrong part.

On the other hand, in the guidance by the notification device 1 described above, the face guidance information is displayed together with the mirror image of the user, and thus the user can understand content thereof intuitively and appropriately.

Further, since a massage cream for massage or the like is on the hands during the massage, if the user is required to perform a manipulation, there arises a problem in that a manipulation button or a touch panel is likely to be dirty. However, in the guidance by the notification device 1 described above, since such manipulation is not required for switching the face guidance information, it is also possible to prevent a problem in that a manipulation button or a touch panel is likely to be dirty.

The notification device 1 having the configuration above includes the state detecting section 112, the guidance notifying section 113, the determining section 114, and the notification control section 115.

The state detecting section 112 sequentially detects the face state of the subject on the basis of a sequentially input image.

The guidance notifying section 113 gives notification of the face guidance information.

The determining section 114 determines whether or not the face state sequentially detected by the guidance notifying section 113 satisfies the state corresponding to the neglected face guidance information.

In a case in which the determining section 114 determines that the state corresponding to the face guidance information to be notified satisfied, the notification control section 115 controls the guidance notifying section 113 such that face guidance information different from the face guidance information to be notified is notified.

Accordingly, it is possible to eliminate the need for the user to perform a manipulation such as a touch manipulation in order to control predetermined notification content (for example, in order to switch predetermined notification content).

In other words, according to the notification device 1, the notification device that gives notification of predetermined information can be more easily used.

In other words, in the related art, in order to control predetermined notification content to be displayed (for example, in order to switch predetermined notification content), it is necessary for the user to perform a manipulation such as a touch manipulation or the like, and the usability is not good, whereas according to the present invention, the user can switch the face guidance information without using the hand, so that the notification device that notifies predetermined information can be used more conveniently.

The notification device 1 further includes the imaging section 16 that sequentially captures an image including the facial image of the subject.

The state detecting section 112 sequentially detects the face state of the subject on the basis of the image sequentially captured by the imaging section 16.

Accordingly, the predetermined notification content can be controlled in real time in accordance with the image captured by the imaging section 16.

The state detecting section 112 sequentially detects the face direction of the subject on the basis of the image. Accordingly, the predetermined notification content can be controlled on the basis of the face direction of the subject.

The state detecting section 112 sequentially detects the part of the face of the subject on the basis of the image. Accordingly, the predetermined notification content can be controlled on the basis of the part of the face of the subject.

The state detecting section 112 sequentially detects the biometric information of the subject on the basis of the image. Accordingly, the predetermined notification content can be controlled on the basis of the biometric information of the subject.

The biometric information is biometric information in a predetermined part of the subject.

Accordingly, the predetermined notification content can be controlled on the basis of the biometric information of a predetermined part of the subject.

The guidance notifying section 113 gives notification of a state corresponding to the face guidance information. Accordingly, the user can control predetermined notification content in accordance with the face guidance information.

The state corresponding to the face guidance information is associated with a predetermined threshold value.

On the basis of the sequentially detected face state and the predetermined threshold value, the determining section 114 determines whether or not the sequentially detected face state satisfies the state corresponding to the notified face guidance information.

Accordingly, the predetermined notification content can be controlled on the basis of a predetermined threshold value.

The predetermined threshold value is a threshold value indicating a predetermined range.

The state detecting section 112 sequentially detects the face direction of the subject from the image.

In a case in which the sequentially detected face direction falls within the predetermined range indicated by the predetermined threshold value, the determining section 114 determines that the sequentially detected face state satisfies the state corresponding to the notified face guidance information.

Accordingly, the predetermined notification content can be controlled on the basis of the range indicated by the threshold value.

The notification control section 115 stops switching the face guidance information when at is determined whether or not the sequentially detected face state satisfies the state corresponding to the notified face guidance information in a series of pieces of guidance of switching a plurality of pieces of face guidance information and giving a notification, and controls the guidance notifying section 113 such that switching of the face guidance information is resumed in a case in which the sequentially detected face state satisfies the state corresponding to the notified face guidance information.

Accordingly, predetermined notification content can be controlled in accordance with a series of pieces of guidance.

The notification device 1 includes the mirror portion 30 that displays the mirror image of the subject and the display section 19 that displays the face guidance information notified by the guidance notifying section 113, and the display surface of the mirror portion 30 and the display surface of the display section 19 are arranged to be superimposed in the viewing direction so that they are viewable at the same time.

Accordingly, the mirror image and the face guidance information can be viewed in a superimposed manner.

MODIFIED EXAMPLES

The present invention is not limited to the above-described embodiment, and variations, improvements, or the like within the scope of achieving the objects of the present invention are included in the present invention.

For example, the embodiment described above may be modified as in the following modified examples.

First Modified Example

In the above-described embodiment, the transition condition that the face guidance information is switched in a case in which the face direction of the user detected by the guidance notifying section 113 becomes a face direction corresponding to the notified face guidance information is used as the transition condition.

The present invention is not limited thereto, and other transition conditions may be used.

For example, a transition condition related to the biometric information of the user may be used.

In this case, for example, a transition condition related to a change in blood flow caused by pressure point pressing or the like in massage may be used.

For example, a condition that the state of the blood flow after the pressure point is pressed is faster than before the pressure point is pressed may be used as the transition condition.

Alternatively, a condition that the state of the blood flow amount after the pressure point is pressed becomes more than before the pressure point is pressed may be used as the transition condition.

Besides, for example, a transition condition related to a skin temperature change caused by pressing of a pressure point or the like in massage or a temperature change in a mouth breath may be used.

In this case, a thermo camera which can measure the temperature of the user is included in the imaging section 16. Further, a condition that, when relative temperature measurement using a thermo camera is performed, a temperature of a position at which the pressure point is pressed is higher than before the pressure point is pressed may be used as the transition condition.

Further, a condition that, when relative temperature measurement using a thermo camera is performed, a temperature of breath by the user who presses the pressure point and a breathing rate (in this case, the number of breaths by the temperature change is measured) is higher than before the pressure point is pressed may be used as the transition condition.

In addition, for example, a transition condition related to a change in moisture content or perspiration amount of the skin or a change in body fat, which is caused by pressing of a pressure point the like in massage may be used.

In this case, a near-infrared camera which can measure them is included in the imaging section 16.

Then, measurement is performed on a predetermined site with a near infrared camera.

Further, a condition that the moisture content or the perspiration amount of the skin of a predetermined part of the user who presses a pressure point is more than before the pressure point is pressed may be used as the transition condition.

Further, a condition that the body fat of a given part of the user who presses a pressure point is more than before the pressure point is pressed may be used as the transition condition.

Second Modified Example

Similarly to the first modified example described above, other transition conditions may be used.

For example, a transition condition related to a position change of a predetermined part in the face or the like of the user may be used.

In this case, the state detecting section 112 specifies the contour of the face of the user and the position of the predetermined part of the user in the contour by face tracking. Further, for example, a condition that a predetermined part such as a mouth corner of the user who performs the smile massage is moved to a predetermined position by the smile massage may be used as the transition condition.

Other Modified Examples

For example, in the above embodiment, it is assumed that the notification device 1 cooperates with the respective servers included in the server group 3, but the functions of the respective servers may be added to the notification device 1, and all the processes may be performed only in the notification device 1.

In the above embodiment, the notification device 1 to which the present invention is applied has been described by way of example of an electronic device incorporated in a portable self-standing mirror, but the present invention is not particularly limited thereto.

For example, the present invention can be applied to an electronic device incorporated into a large mirror such as a full-length mirror, an electronic device incorporated into a stationary bathroom vanity, and a mirror-shaped electronic device installed in a bathroom.

The processing sequence described above can be executed by hardware, and can also be executed by software.

In other words, the functional configuration of FIG. 5 is merely an illustrative example, and the present invention is not particularly limited thereto.

A single functional block may be configured by a single piece of hardware, a single installation of software, or a combination thereof.

The functional configurations of the present embodiment, are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or recording medium to a computer or the like.

The computer may be a computer equipped with dedicated hardware.

In addition, the computer may be a computer capable of executing various functions, e.g., a general purpose personal computer, by installing various programs.

The storage medium containing such a program can not only be constituted by the removable medium 100 of FIG. 2 distributed separately from the device main body for supplying the program to a user, but also can be constituted by a storage medium or the like supplied to the user in a state incorporated in the device main body in advance.

The removable medium 100 is composed of for example, a magnetic disk (including a floppy disk), an optical disk, a magnetic optical disk, or the like.

The optical disk is composed of, for example, a CD-ROM (Compact Disk-Read Only Memory), a DVD (Digital Versatile Disk), Blu-ray (Registered Trademark) or the like.

The magnetic optical disk is composed of an MD (Mini-Disk) or the like.

The storage medium supplied to the user in a state incorporated in the device main body in advance is constituted by, for example, the ROM 12 of FIG. 4 in which the program is recorded or a hard disk included in the storage section 20 of FIG. 4 or 5, etc.

It should be noted that, in the present specification, the steps defining the program recorded in the storage medium include not only the processing executed in a time series following this order, but also processing executed in parallel or individually, which is not necessarily executed in a time series.

Further, in the present specification, the terminology of the system means an entire apparatus including a plurality of apparatuses and a plurality of units.

The embodiments of the present invention described above are only illustrative, and are not to limit the technical scope of the present invention.

The present invention can assume various other embodiments. Additionally, it is possible to make various modifications thereto such as omissions or replacements within a scope not departing from the spirit of the present invention.

These embodiments or modifications thereof are within the scope and the spirit of the invention described in the present specification, and within the scope of the invention recited in the claims and equivalents thereof.

What is claimed is:

1. A notification device comprising:
    a memory; and
    a processor,
    wherein the processor executes a program stored in the memory to perform operations comprising:
    sequentially capturing an image including a facial image of a subject;
    sequentially detecting a face state of the subject on the basis of the sequentially captured image;
    sequentially detecting the face state of the subject by measuring biometric information of the subject on the basis of a specific signal contained in images which are sequentially input;
    giving notification of face guidance information;
    determining whether or not the face state sequentially detected when the notification of the face guidance information is given has changed based on a change in the specific signal; and
    when it is determined that the face state has changed based on the change in the specific signal, in a case in which a change of the state satisfies a predetermined transition condition of the face guidance information, controlling the face guidance information for which the notification is given to be switched to a face guidance information corresponding to the transition condition,
    the specific signal being a green signal absorbed by subcutaneous blood hemoglobin in the subject,
    the notification device further comprising:
    a first display section that displays a mirror image of the subject; and
    a second display section that displays the face guidance information notified by a notifying mechanism,
    and wherein
    a display surface of the first display section and a display surface of the second display section are arranged to be superimposed in a viewing direction so that the display surface of the first display section and the display surface of the second display section are viewable at the same time.

2. The notification device according to claim 1, wherein the processor is further configured to sequentially detect a face direction of the subject on the basis of the image.

3. The notification device according to claim 1, wherein the processor is further configured to sequentially detect a part of the face of the subject on the basis of the image.

4. The notification device according to claim 1, wherein the biometric information is biometric information in a predetermined part of the subject.

5. The notification device according to claim 1, wherein the processor is further configured to give notification of a state corresponding to the face guidance information.

6. The notification device according to claim 1, wherein the state corresponding to the face guidance information is associated with a predetermined threshold value, and the processor is further configured to determine whether or not the sequentially detected face state satisfies a state corresponding to the notified face guidance information on the basis of the sequentially detected face state and the predetermined threshold value.

7. The notification device according to claim 6, wherein the predetermined threshold value is a threshold value indicating a predetermined range, and the processor is further configured to
- sequentially detect a face direction of the subject from the image, and
- determine that the sequentially detected face state satisfies the state corresponding to the notified face guidance information in a case in which the sequentially detected face direction falls within a predetermined range indicated by the predetermined threshold value.

8. The notification device according to claim 1, wherein the processor is further configured to
- stop switching of the face guidance information when determining whether or not the sequentially detected face state satisfies a state corresponding to the notified face guidance information, in a series of pieces of guidance of switching a plurality of pieces of face guidance information and giving a notification, and
- control the notification such that the switching of the face guidance information which has been stopped is resumed in a case in which it is determined, while the switching of the face guidance information is stopped, that the sequentially detected face state satisfies the state corresponding to the notified face guidance information.

9. A notification method executed by a computer including a processor, the notification method causing the processor to execute a program stored in a memory to perform operations comprising:
- sequentially capturing an image including a facial image of a subject;
- sequentially detecting a face state of the subject on the basis of the sequentially captured image;
- sequentially detecting the face state of the subject by measuring biometric information of the subject on the basis of a specific signal contained in images which are sequentially input;
- giving notification of face guidance information;
- determining whether or not the face state sequentially detected when the notification of the face guidance information is given has changed based on a change in the specific signal; and
- when it is determined that the face state has changed based on the change in the specific signal, in a case in which a change of the state satisfies a predetermined transition condition of the face guidance information, controlling the face guidance information for which the notification is given to be switched to a face guidance information corresponding to the transition condition,
- the specific signal being a green signal absorbed by subcutaneous blood hemoglobin in the subject, and
- superimposing a display surface of that displays a mirror image of the subject, and a display surface of a second display section that displays the face guidance information, in a viewing direction so that the display surface of the first display section and the display surface of the second display section are viewable at the same time.

10. A non-transitory computer-readable storage medium storing a program that is executed by a computer that comprises a processor to control a notification device, the program being executable to cause the computer to perform operations comprising:
- sequentially capturing an image including a facial image of a subject;
- sequentially detecting a face state of the subject on the basis of the sequentially captured image;
- sequentially detecting the face state of the subject by measuring biometric information of the subject on the basis of a specific signal contained in images which are sequentially input;
- giving notification of face guidance information;
- determining whether or not the face state sequentially detected when the notification of the face guidance information is given has changed based on a change in the specific signal; and
- when it is determined that the face state has changed based on the change in the specific signal, in a case in which a change of the state satisfies a predetermined transition condition of the face guidance information, controlling the face guidance information for which the notification is given to be switched to a face guidance information corresponding to the transition condition,
- the specific signal being a green signal absorbed by subcutaneous blood hemoglobin in the subject, and
- superimposing a display surface of that displays a mirror image of the subject, and a display surface of a second display section that displays the face guidance information, in a viewing direction so that the display surface of the first display section and the display surface of the second display section are viewable at the same time.

* * * * *